(12) United States Patent
Lazaridis et al.

(10) Patent No.: US 9,654,981 B2
(45) Date of Patent: May 16, 2017

(54) DATA INTEGRITY FOR PROXIMITY-BASED COMMUNICATION

(75) Inventors: Mihal Lazaridis, Waterloo (CA); Mark E. Pecen, Waterloo (CA); Scott Alexander Vanstone, Campbellville (CA); Matthew John Campagna, Ridgefield, CT (US); Anthony Rosati, Ottawa (CA)

(73) Assignees: BlackBerry Limited, Waterloo, ON (CA); Certicom Corp., Mississauga, ON (CA)

( * ) Notice: Subject to any disclaimer, the term of this patent is extended or adjusted under 35 U.S.C. 154(b) by 0 days.

(21) Appl. No.: 14/131,129

(22) PCT Filed: Jul. 11, 2011

(86) PCT No.: PCT/US2011/043538
§ 371 (c)(1),
(2), (4) Date: Jan. 6, 2014

(87) PCT Pub. No.: WO2013/009288
PCT Pub. Date: Jan. 17, 2013

(65) Prior Publication Data
US 2014/0141750 A1 May 22, 2014

(51) Int. Cl.
*H04W 12/10* (2009.01)
*H04W 4/00* (2009.01)
(Continued)

(52) U.S. Cl.
CPC ......... *H04W 12/10* (2013.01); *H04L 63/0492* (2013.01); *H04L 63/126* (2013.01);
(Continued)

(58) Field of Classification Search
CPC ............... H04L 2209/80; H04L 9/3234; H04L 63/0492; H04L 63/062; H04W 12/06;
(Continued)

(56) References Cited

U.S. PATENT DOCUMENTS 8,498,618 B2 * 7/2013 Ben Ayed .................. 455/411
8,873,755 B2   10/2014 Mathur
(Continued)

FOREIGN PATENT DOCUMENTS

CN    101241537    8/2008
CN    101999226    3/2011
(Continued)

OTHER PUBLICATIONS

Office Action issued in Chiense Applicattion No. 201180072237.5 on Mar. 17, 2017 (USPTO internally, machine translated version.*
(Continued)

*Primary Examiner* — Kashif Siddiqui
*Assistant Examiner* — Minjung Kim
(74) *Attorney, Agent, or Firm* — Fish & Richardson P.C.

(57) ABSTRACT

Methods, systems, and computer programs for trusted communication among mobile devices are described. In some aspects, information is wirelessly transmitted from a first mobile device to a second mobile device. The information permits the second mobile device to detect proximity of the first mobile device. In some implementations, the information can be wirelessly transmitted by a proximity-activated wireless interface, such as, for example, a Near Field Communication (NFC) interface. In response to the information, the first mobile device receives a message and a first authentication value wirelessly transmitted from the second mobile device to the first mobile device. A second authentication value is generated at the first mobile device based on the message and the shared secret value. Integrity of the message is verified based on comparing the first authentication value and the second authentication value.

34 Claims, 6 Drawing Sheets

(51) Int. Cl.
  *H04L 29/06* (2006.01)
  *H04W 12/06* (2009.01)
  *H04W 92/18* (2009.01)

(52) U.S. Cl.
  CPC ........... *H04W 4/008* (2013.01); *H04W 12/06* (2013.01); *H04L 63/0823* (2013.01); *H04W 92/18* (2013.01)

(58) Field of Classification Search
  CPC ..... H04W 8/005; H04W 4/008; H04W 92/18; H04M 1/7253; G08B 21/0277
  See application file for complete search history.

(56) References Cited

U.S. PATENT DOCUMENTS

| | | | |
|---|---|---|---|
| 2002/0197956 A1* | 12/2002 | Annola et al. | 455/41 |
| 2004/0117626 A1* | 6/2004 | Andreasyan | H04L 9/3263 713/175 |
| 2006/0072151 A1* | 4/2006 | Amani et al. | 358/1.15 |
| 2007/0055633 A1 | 3/2007 | Cheon et al. | |
| 2008/0065877 A1 | 3/2008 | Son et al. | |
| 2008/0065892 A1* | 3/2008 | Bailey et al. | 713/171 |
| 2008/0155257 A1 | 6/2008 | Werner et al. | |
| 2008/0313079 A1 | 12/2008 | Van Bosch et al. | |
| 2009/0103732 A1 | 4/2009 | Benteo et al. | |
| 2009/0144550 A1 | 6/2009 | Arunan | |
| 2009/0158394 A1* | 6/2009 | Oh | G06F 21/31 726/3 |
| 2009/0167487 A1 | 7/2009 | Shah | |
| 2009/0327724 A1 | 12/2009 | Shah | |
| 2010/0043061 A1 | 2/2010 | Martin et al. | |
| 2010/0045425 A1* | 2/2010 | Chivallier | 340/5.8 |
| 2010/0272254 A1 | 10/2010 | Cheon et al. | |
| 2010/0291952 A1* | 11/2010 | Gosset et al. | 455/466 |
| 2010/0297946 A1* | 11/2010 | Alameh et al. | 455/41.3 |
| 2010/0303236 A1* | 12/2010 | Laaksonen et al. | 380/270 |
| 2011/0051927 A1* | 3/2011 | Murray | H04L 9/003 380/28 |
| 2011/0070826 A1* | 3/2011 | Griffin et al. | 455/41.1 |
| 2011/0207438 A1* | 8/2011 | Sanjeev | 455/414.1 |
| 2011/0210830 A1* | 9/2011 | Talty | H04B 5/0031 340/10.51 |
| 2011/0238989 A1* | 9/2011 | Machani et al. | 713/168 |
| 2011/0280403 A1* | 11/2011 | DeLuca | 380/278 |
| 2012/0083209 A1* | 4/2012 | Giles et al. | 455/41.2 |
| 2012/0166791 A1* | 6/2012 | Barton et al. | 713/150 |
| 2013/0217330 A1* | 8/2013 | Gardenfors et al. | 455/41.2 |
| 2014/0137197 A1 | 5/2014 | Lazaridis et al. | |

FOREIGN PATENT DOCUMENTS

| | | |
|---|---|---|
| WO | 03/081934 | 10/2003 |
| WO | 2005/079038 | 8/2005 |

OTHER PUBLICATIONS

Calmels, Benoit et al.; "Low-Cost Cryptography for Privacy in RFID Systems"; Jan. 1, 2006; Smart Card Research and Advanced Applications Lecture Notes in Computer Science; pp. 237-251.

Lopez Calvet, Juan Carlos; "The Role of RFID in the Mobile Phone"; Telektronikk, Telenor AS; No. 3; Apr. 1, 2005; pp. 131-142.

International Search Report and Written Opinion of the International Searching Authority issued in International Application No. PCT/US2011/043538 on Apr. 3, 2012; 10 pages.

Written Opinion of the Interantional Preliminary Examining Authority issued in International Application No. PCT/US2011/043538 on Jun. 18, 2013; 7 pages.

International Preliminary Report on Patentability issued in International Application No. PCT/US2011/043538 on Sep. 17, 2013; 8 pages.

International Search Report and Written Opinion of the International Searching Authority issued in International Application No. PCT/US2011/043518 on Apr. 3, 2012; 10 pages.

Written Opinion of the International Preliminary Examining Authority issued in International Application No. PCT/US2011/043518 on Jun. 18, 2013; 7 pages.

International Preliminary Report on Patentability issued in International Application No. PCT/US2011/043518 on Sep. 17, 2013; 7 pages.

National Institute of Standards and Technology, FIPS Pub 198: The Keyed-Hash Message Authentication Code (HMAC), URL: http://csrc.nist.gov/publications/fips/fips198/fips-198a.pdf, 20 pages, dated Mar. 6, 2002.

NFC Forum, Signature Record Type Definition, Technical Specification—Signature 1.0, 18 pages, dated Nov. 18, 2010.

NFC Forum, NFC Activity Specification, Technical Specification—Activity 1.0, 117 pages, dated Nov. 18, 2010.

NFC Forum, Connection Handover, Technical Specification—Connection Handover 1.2, 27 pages, dated Jul. 7, 2010.

Wikipedia, Bluetooth, URL: http://en.wikipedia.org/wiki/Bluetooth, 24 pages, dated Jun. 22, 2011.

Wikipedia, Near Field Communication, URL: http://en.wikipedia.org/wiki/Near_Field_Communication, 19 pages, dated Jun. 22, 2011.

Wikipedia, Wi-Fi Protected Setup, URL: http://en.wikipedia.org/wiki/Wi-Fi_Protected_Setup, 3 pages, dated Jun. 13, 2011.

Wi-Fi.org, Security, URL: http://www.wi-fi.org/security, accessed Jun. 23, 2011, 2 pages, copyright 2011 Wi-Fi Alliance.

Communication Pursuant to Article 94(3) EPC issued in related European Application No. 11733972.1 on Apr. 5, 2016.

Communication Pursuant to Article 94(3) EPC issued in related European Application No. 11733973.9 on Apr. 18, 2016.

Office Action issued in Chinese Application No. 201180072243.0 on Jul. 7, 2016.

Office Action issued in Canadian Application No. 2841776 on Oct. 4, 2016.

Office Action issued in Canadian Application No. 2841063 on Oct. 5, 2016.

Office Action issued in Chinese Application No. 201180072237.5 on Jul. 26, 2016.

Office Action issued in Chinese Application No. 201180072237.5 on Mar. 17, 2017.

* cited by examiner

DATA INTEGRITY FOR PROXIMITY-BASED COMMUNICATION

CLAIM OF PRIORITY

This application is a U.S. National Stage of International Application No. PCT/US2011/043538 filed on Jul. 11, 2011, the entire contents of which is hereby incorporated by reference.

BACKGROUND

This specification relates to data integrity for proximity-based communication.

Some mobile devices include a near field communication (NFC) chip that enables the mobile device to communicate wirelessly with other NFC-enabled components. For example, tapping an NFC-enabled mobile device to a passive NFC tag can cause the NFC tag to wirelessly transmit data to the mobile device. In some instances, mobile devices can communicate directly with each other using NFC technology, for example, in a peer-to-peer mode.

BRIEF DESCRIPTION OF THE DRAWINGS

Like reference numbers and designations in the various drawings indicate like elements.

DETAILED DESCRIPTION

Figure 1A:
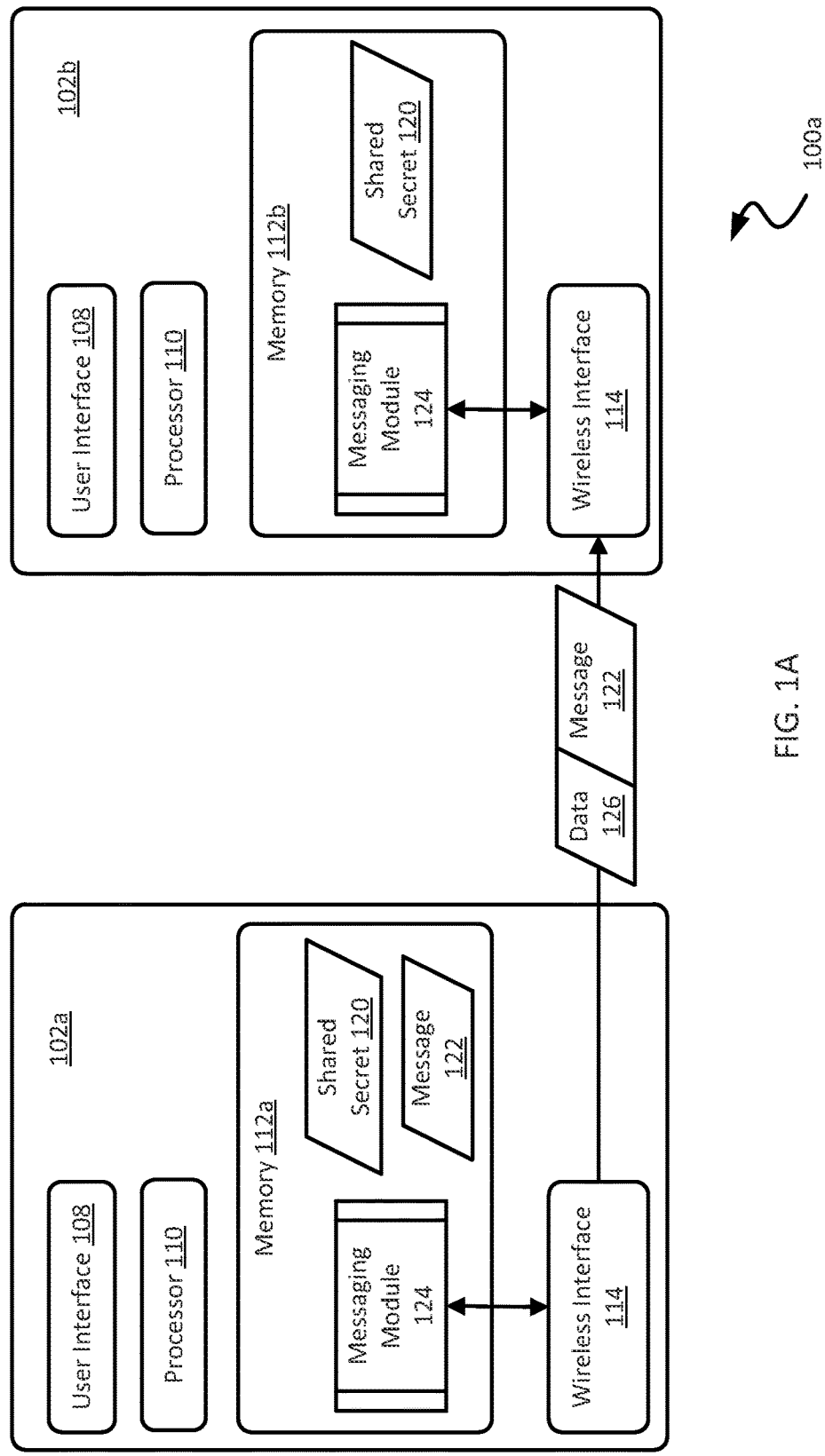
FIG. 1A is a schematic diagram of an example communication system.

Users who have multiple devices, such as a smartphone and a tablet, may want the ability to view content or execute actions on either device in a seamless way, for example, without having to acknowledge or confirm interactions between their devices. As a particular example, a user may receive a link on a smartphone and want to open the link on the larger display of a tablet device. As another example, a user may view a phone number (or the name of a contact, or other information associated with a phone number) on a tablet device and want to initiate a call to the phone number using their smartphone, which has access to a telecommunication network. As yet another example, a user may view a phone number (or the name of a contact, or other information associated with a phone number) on a handheld device and want to initiate a call to the phone number using their speakerphone, which has wireless or landline access to telecommunication network.

More generally, users may want their devices to trust each other, for example, so that their devices can interact seamlessly and allow applications to run on the best-suited device. Similarly, multiple different users may want their devices to trust each other, for example, so that the users can seamlessly share content or other types of information. For example, users may want their devices to communicate without repeated pairing, confirmation steps, syncing steps, or other operations that can interrupt the user experience. Moreover, many devices include proximity-based wireless communication modules, and users may want their devices to seamlessly exchange application-independent messages, while taking advantage of the proximity-based wireless communication features available on their devices.

A trust mechanism can be established between devices so that the devices can automatically verify integrity of wireless communications, for example, without requiring user acknowledgment or confirmation. For example, eliminating user acknowledgment or confirmation steps for wireless interactions, without additional countermeasures in place, can render a device vulnerable to certain types of attacks, for example, launched by non-trusted devices.

In some implementations, trust can be established among devices based on a secret value shared by the devices. The shared secret can be used to verify integrity of messages received from other devices, for example, messages received by proximity-based interactions. Moreover, the shared secret can be used to verify the integrity of messages independent of third party certification. For example, in some instances, once the shared secret is established on the devices, the shared secret can be utilized without reference to a certificate authority or other conventional Public Key Infrastructure (PKI) paradigms.

One example of proximity-based communication is provided by Near Field Communication (NFC) technology. In some implementations, NFC technology enables data exchange between devices at a distance of approximately four to ten centimeters, at rates of approximately 100 kbps. NFC-enabled devices can be made to transfer information between devices by simply placing them near each other. For example, "tapping" or otherwise bringing two NFC-enabled device within range of each other may cause one or both of the devices to send a message to the other device.

Some NFC-enabled devices include passive components. For example, some NFC tags operate passively, utilizing power received wirelessly from an active NFC device. Accordingly, some NFC devices can operate in a listening mode or another passive mode of operation. An NFC device operating in a listening mode can receive wireless signals transmitted by other NFC devices. The listening NFC device can respond by transmitting a signal that allows the other NFC device to detect proximity of the listening NFC device. The response can be generated based on energy extracted from the signal received by the listening NFC device, energy stored at the listening NFC device, or energy from other sources.

Some NFC-enabled devices include active components. For example, some NFC devices have an internal power source or they can be integrated into a device (e.g., a smartphone, a tablet, etc.) having an internal power source. Such active devices can operate in a listening mode as outlined above. Additionally or alternatively, an active NFC device can operate in a polling mode. An NFC device operating in a polling made can send periodic polling signals or other interrogation messages that allow other NFC devices to detect proximity of the polling NFC device. The polling NFC device can detect proximity of other NFC devices, for example, when the other NFC devices respond to the polling signal.

NFC-enabled devices communicate with each other wirelessly by electromagnetic signals. For example, some currently available NFC-enable devices utilize radio frequency signals at or near 13.56 MHz. Whether two NFC-enabled devices detect proximity of each other can be a function of the effective range of their NFC modules and other factors. In various contexts, the effective range at which NFC modules can detect each other may depend, for example, on the power and frequency of the signals transmitted, the transmission environment, the orientation of the devices, and other considerations. For example, a listening NFC device may detect proximity of a polling NFC device when the listening NFC device receives a signal having a signal-to-noise ratio greater than a threshold level. Similarly, a polling NFC device may detect proximity of a another device when the polling NFC device receives a signal having a signal-to-noise ratio greater than a threshold level. Different NFC devices may have different effective ranges, and they may have different thresholds for detecting proximity of other devices. Moreover, proximity can be detected based on additional or different criteria. In some examples, NFC-enabled devices are configured to detect proximity of other NFC-enabled devices within a range of about four to ten centimeters. NFC-enabled devices can potentially be configured to detect NFC-enabled devices, or other types of devices, in a different range.

In some implementations, a device may detect proximity of another device based on additional or different techniques. For example, a device may include an accelerometer, a directional coupler, or a combination of these and other components that enhance proximity-detection features provided by NFC or another type of proximity-based wireless communication technology. In some instances, a device can detect proximity of another device based on physical contact between the devices. For example, some devices may include sensors that detect proximity of another device based on non-conductive contact (e.g., "tapping"), conductive contact (e.g., wires or leads), or another type of conductive or non-conductive contact with the other device.

FIG. 1A is a schematic diagram of an example communication system 100a. The example communication system 100a includes mobile devices 102a, 102b. The communication system 100a can include additional or different features and components. For example, the communication system 100a can include one or more networks, servers, computing systems, additional or different mobile devices, or any suitable combination of these other components. The components of the communication system 100a can be configured as shown in FIG. 1A, or the communication system 100a can be configured in another manner, as appropriate.

Figure 1B:
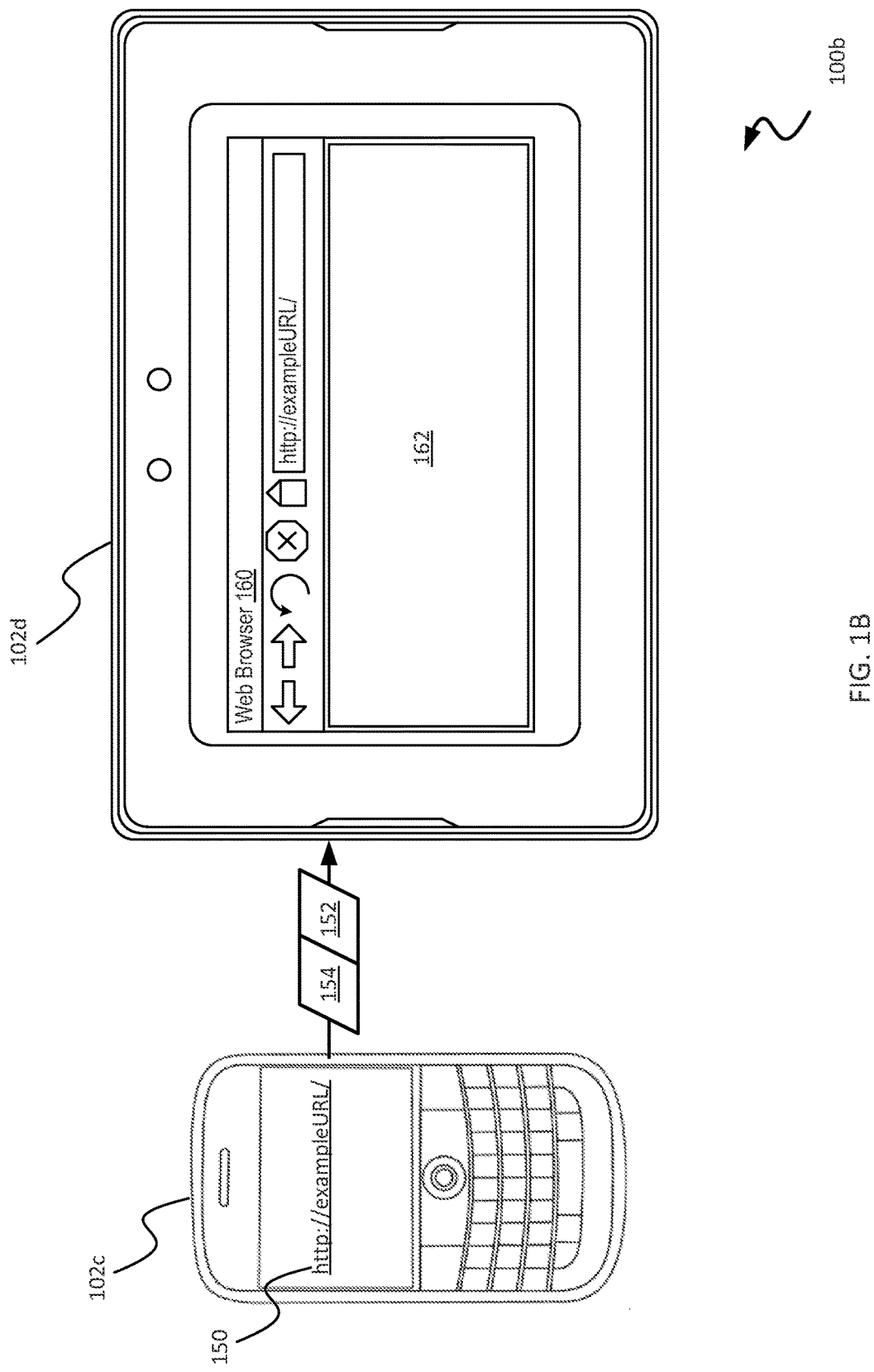
FIG. 1B is a schematic diagram of another example communication system.
Figure 2:
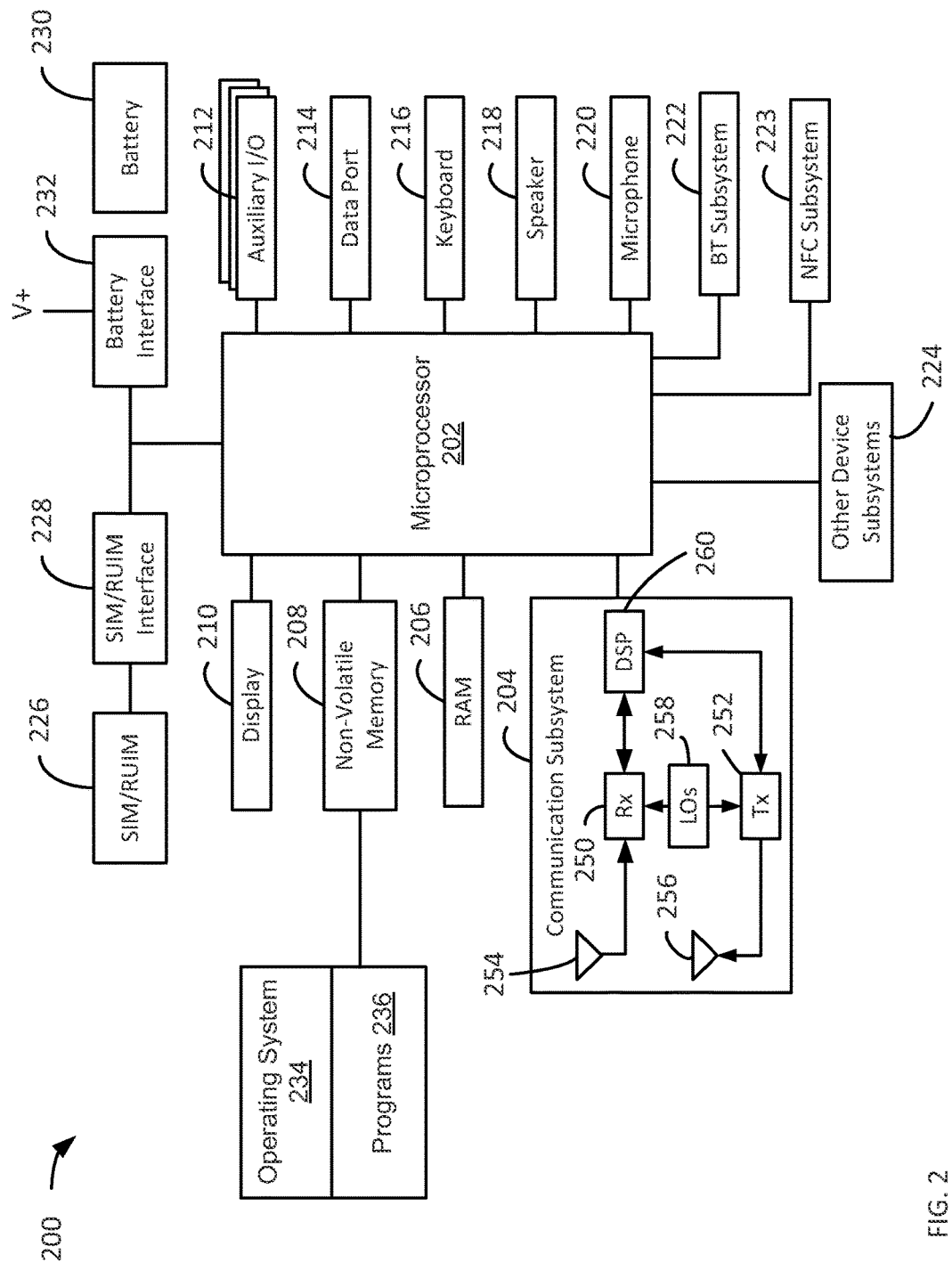
FIG. 2 is a schematic diagram of an example mobile telecommunication device.

Generally, the mobile devices 102a, 102b can include any appropriate types of subsystems, modules, devices, components, and combinations thereof. Examples of mobile devices include various types of mobile telecommunication devices, smartphones, smartcards, identification devices, media players, headsets, personal digital assistants (PDAs), laptops, notebooks, tablets, etc. Example mobile devices are shown in FIG. 1B and FIG. 2. The example communication system 100a can include additional or different types of devices, as appropriate. For example, in some implementations, another type of computing device can be substituted for one or both of the mobile devices 102a, 102b.

The mobile devices 102a and 102b can be identical, similar, or different types of devices. For example, the first mobile device 102a can be a mobile telecommunication device, and the second mobile device 102b can be a tablet device or a laptop device. As another example, the first mobile device 102a and the second mobile device 102b can both be mobile telecommunication devices, or they can both be tablet devices.

The example mobile devices 102a, 102b shown in FIG. 1A each include a user interface 108, a processor 110, a memory 112a or 112b, and a wireless interface 114. The mobile devices 102a, 102b can include additional or different features or components. The features and components of the mobile devices 102a, 102b can be configured as shown and described with respect to FIG. 1A, or the features and components of one or both of the mobile devices 102a, 102b can be configured in a different manner. In some implementations, the user interfaces 108, the processors 110, the memories 112a, 112b, the wireless interfaces 114, and possibly other components of the two mobile devices 102a, 102b can be the same, or they can be different.

The user interface 108 can include any suitable user interface devices or components. For example, the user interface 108 can include a touchscreen, a keyboard, a microphone, a pointing device (e.g., a mouse, a trackball, a stylus, etc.), or another type of user interface. The user interface 108 can detect a user interaction and generate computer-readable data or signals based on the user interaction. For example, the user interface may convert a user's keystrokes or other interactions to a voltage signal, and transmit the voltage signal to the processor 110, which can convert the voltage signals to binary information for storage or further processing.

The processor 110 can include any suitable data processing apparatus. For example, one or more aspects of the processor 110 may be implemented by a microprocessor, a digital microcontroller, digital or analog circuitry, or a combination of these and other types of data processing hardware or firmware. The processor 110 can include a main processor of the mobile device, and possibly one or more co-processors of the mobile device. In some implementations, the processor 110 includes a general purpose processor. Additionally or alternatively, the processor 110 can include one or more special purpose processors, such as, for example, a cryptographic processor, a video compression processor, or another type of special purpose processor. In some instances, one or more components of the processor 110 can be integrated or otherwise associated with another component of the mobile device.

The processor 110 can execute instructions, for example, to generate output data based on data inputs. The instructions can include programs, codes, scripts or other types of data stored in memory. Additionally or alternatively, the instructions can be encoded as pre-programmed or re-programmable logic circuits, logic gates, or other types of hardware or firmware components. In some instances, the processor 110 can generate output data by executing and/or interpreting software, scripts, programs, functions, executables, and/or other modules stored in the memory 112a or 112b. The processor 110 may perform one or more of the operations shown in FIG. 3, 4A, 4B, or 4C. In some cases, the processor executes one or more operations of the messaging module 124.

The memories 112a, 112b can include any suitable computer-readable media. The memories 112a, 112b can include a volatile memory device, a non-volatile memory device, or both. The memories 112a, 112b can include one or more read-only memory devices, random-access memory devices, buffer memory devices, or a combination of these and other types of memory devices. In some instances, one or more components of the memory can be integrated or otherwise associated with another component of the mobile device.

The memories 112a, 112b can store instructions (e.g., computer code) associated with an operating system, computer applications, and/or other resources. The memories 112a, 112b can store application data and data objects that can be interpreted by one or more applications and/or virtual machines running on the mobile device. The example memory 112*b* of the mobile device 102*b* includes a messaging module 124 and a shared secret 120; the example memory 112*a* of the mobile device 102*a* includes a messaging module 124, a shared secret 120, and a message 122. The memories 112*a*, 112*b* can include additional or different types of modules and data, as appropriate.

The shared secret 120 can include any private information stored locally on both of the mobile devices 102*a*, 102*b*. For example, the shared secret 120 can be a symmetric key or another type of private value that is locally accessible on both mobile devices 102*a*, 102*b*. The shared secret 120 can include a single shared secret value or multiple shared secret values. The shared secret 120 can include any suitable information, which may be established between the mobile devices 102*a*, 102*b* by any appropriate technique.

Figure 4A:
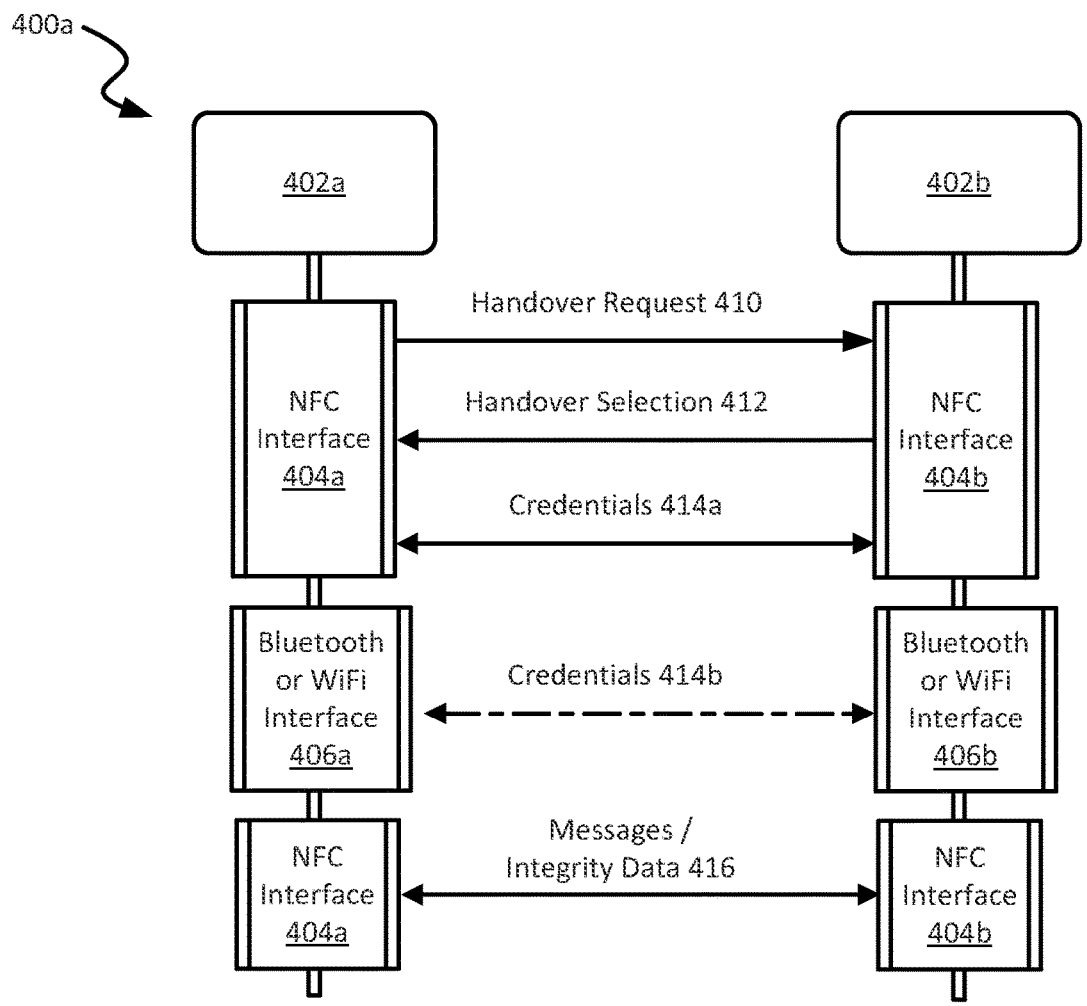
FIGS. 4A-4C are signaling and flow diagrams showing example techniques for establishing a shared secret among devices.
Figure 4B:
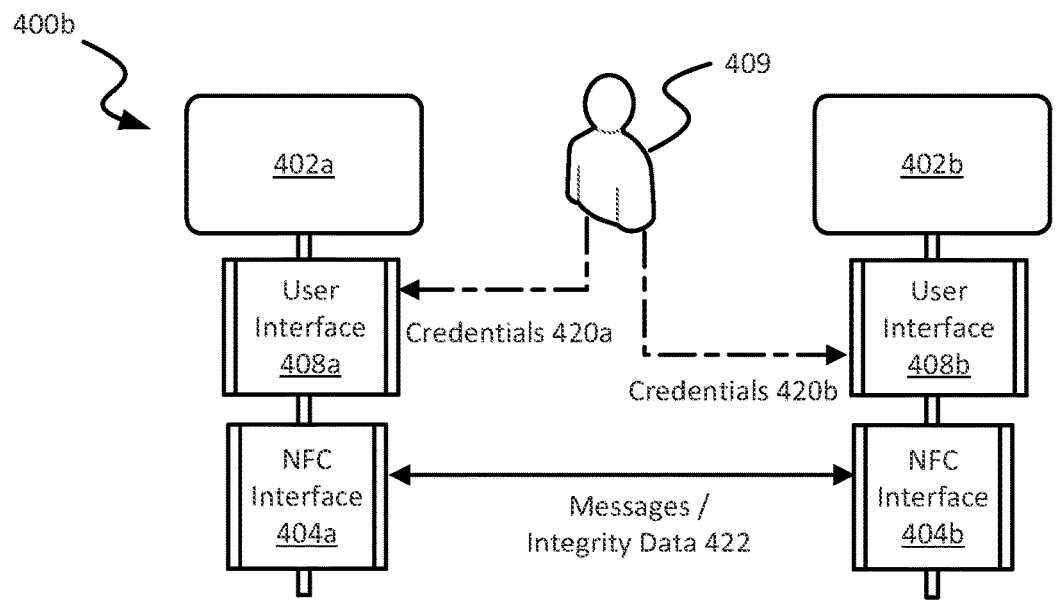
Figure 4C:
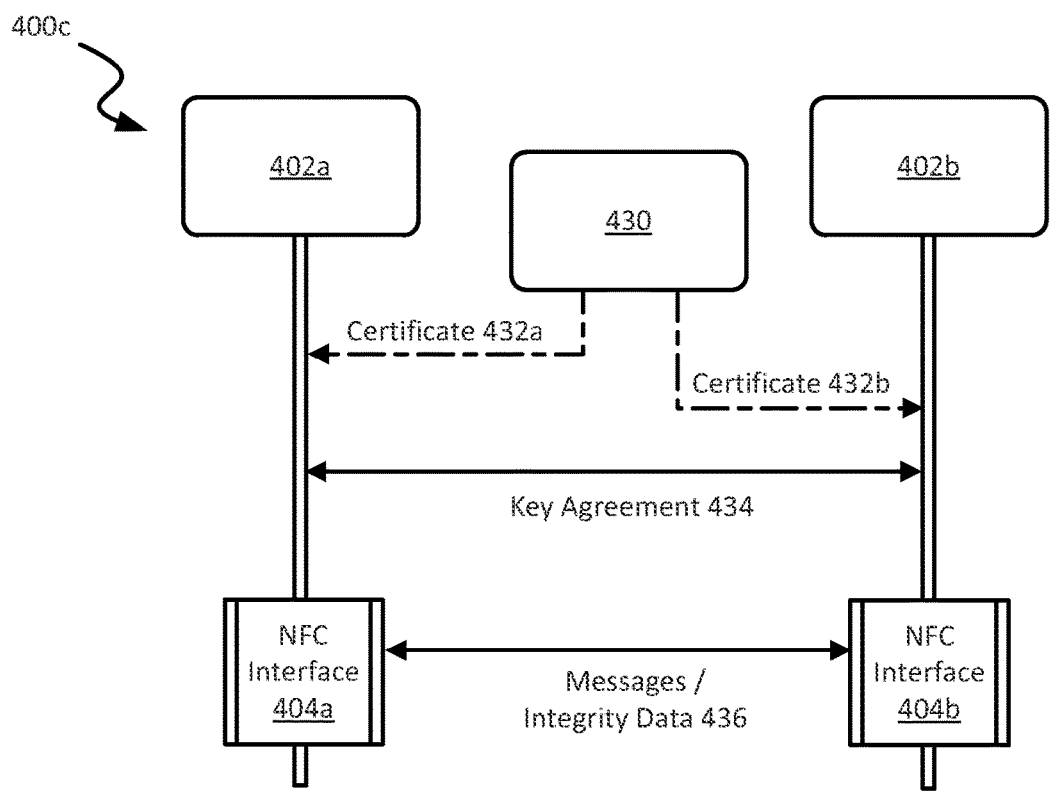

In some implementations, the shared secret 120 is established based on one or more of the techniques shown in FIG. 4A, 4B, or 4C, or by another technique. For example, the shared secret 120 can be (or can be derived from) a secret value entered by a user at both mobile devices 102*a*, 102*b*. As another example, the shared secret 120 can be (or can be derived from) a secret value transmitted to both devices over a private channel, or from one of the mobile devices 102*a*, 102*b* to the other device over a private channel. In some instances, the shared secret 120 can be established based on communication between the mobile devices 102*a*, 102*b* over a public channel. For example, the shared secret 120 can be established based on a key agreement protocol, based on a pairing protocol, or based on additional or different techniques.

The shared secret 120 can be stored on the first mobile device 102*a* with additional information that associates the shared secret 120 with the second mobile device 102*b*. For example, the shared secret 120 can be stored with (or in association with) information that identifies an address, component, or user of the second mobile device 102*b*. As such, the first mobile device 102*a* can access the shared secret 120 for use in communication with the second mobile device 102*b*. Similarly, the shared secret 120 can be stored on the second mobile device 102*b* with additional information that associates the shared secret 120 with the first mobile device 102*a*. Accordingly, the second mobile device 102*b* may access the shared secret 120 for use in communication with the first mobile device 102*a*. The mobile devices 102*a*, 102*b* may store additional shared secrets that are associated with additional or different devices or entities.

The message 122 can include any type of information appropriate for transmission by the wireless interface 114. For example, the message 122 can include a link to content, information identifying or describing attributes of a user or a device, routing information for a contact (e.g., a phone number, an e-mail address, an IP address, etc.), or a combination of these and other types of information. In some instances, the message 122 can include content such as, for example, text data, image data, audio data, multimedia data, or a combination of these and other types of information.

The messaging module 124 can be implemented by hardware, software, firmware, or a combination thereof. For example, in some cases, all or part of the messaging module 124 can be implemented as a software program executed by a microprocessor. As another example, in some cases, all or part of the messaging module 124 can be implemented in digital or analog circuitry. In some instances, the messaging module 124 is integrated with and/or utilizes other software or hardware resources of the mobile device, or the messaging module 124 can be a standalone module. In some implementations, some or all operations of the messaging module 124 can be executed by the processor 110 of the mobile device, by the wireless interface 114 of the mobile device, or by any suitable combination of these and other components of the mobile device.

In the example shown in FIG. 1A, the messaging module 124 can utilize the shared secret 120 to provide trusted communications between the mobile devices 102*a*, 102*b*. For example, the messaging module 124 of the first mobile device 102*a* may utilize the shared secret 120 to generate data 126 that can be used by the second mobile device 102*b* to verify integrity of the message 122. The messaging module 124 can use any suitable functions, operations, or algorithms to generate the data 126. In some implementations, the messaging module 124 may perform one or more of the operations shown in FIG. 3, 4A, 4B, or 4C.

In some implementations, the messaging module 124 of the first mobile device 102*a* can append the data 126 to the message 122 or otherwise associate the data 126 and the message 122 for transmission to the second mobile device 102*b*. In some implementations, the messaging module 124 instructs the wireless interface 114 to wirelessly transmit the message 122 and the data 126. The messaging module 124 of the second mobile device 102*b* can access the shared secret 120 and verify integrity of the message 122 based on the data 126 and the shared secret 120. The messaging module 124 can use any suitable functions, operations, or algorithms to verify integrity of the message 122 based on the data 126.

The data 126 can include any type of information that can be used to verify integrity of messages. For example, in some implementations, the data 126 includes an authentication value. The authentication value can include information generated based on the message 122, the shared secret 120, and possibly other information. For example, because the authentication value included in the data 126 is generated based on the message 122 and the shared secret 120, the second mobile device 102*b* can verify the message 122 based on the authentication value and have some assurance that the message 122 was sent from a trusted source.

In some implementations, the messaging module 124 of the first mobile device 102*a* generates the authentication value included in the data 126, and the data 126 is transmitted to the second mobile device 102*b* with the message 122. The messaging module 124 of the second mobile device 102*b* can then generate a test authentication value for comparison to the authentication value included in the data 126. In some cases, if the second mobile device 102*b* determines that the authentication values match, the second mobile device 102*b* can accept the message; if the second mobile device 102*b* determines that the authentication values do not match, the second mobile device 102*b* can reject the message.

In some implementations, the authentication value is a Message Authentication Code (MAC). For example, a MAC may be generated by a keyed Hash-based Message Authentication Code (HMAC) algorithm, or another type of algorithm. In some cases, a MAC generated by an HMAC algorithm can be used to simultaneously verify integrity and authenticity of the underlying message. Additional or different types of authentication values may be used. In some instances, the data 126 includes a timestamp associated with the authentication value. For example, the timestamp may be used as a countermeasure against replay attacks. Accordingly, in some cases the data 126 includes an authentication value and a timestamp value. The data 126 can include additional or different types of information.

The wireless interface 114 can include any suitable wireless interface. The wireless interface 114 may include, for example, a controller, a transceiver, and an antenna in any suitable configuration. The wireless interface 114 may include additional or different components. In some implementations, the wireless interface 114 is a proximity-activated wireless interface. For example, the wireless interface 114 can be an NFC interface or another type of proximity-activated wireless interface. Additional or different types of wireless interfaces, proximity-activated or otherwise, may be used. The wireless interface 114 of the first mobile device 102a can wirelessly communicate directly with the wireless interface 114 of the second mobile device 102b. The mobile devices 102a, 102b may include one or more additional wireless interfaces that communicate indirectly, for example, through a router, a hub, a relay, a gateway, or another type of intermediary component or device. As a specific example, in some implementations the mobile devices 102a, 102b can communicate with each other indirectly over a data network or a telecommunications network.

The wireless interface 114 can detect proximity of another suitable device based on wireless interactions with the other device. For example, the wireless interface 114 may wirelessly transmit a polling signal or another type of interrogation message, and another device may receive the polling signal and transmit a response that can be detected by the wireless interface 114. As such, the wireless interface 114 may detect proximity of another device based on the other device's response to a polling signal or another type of interrogation message. As another example, the wireless interface 114 may wirelessly receive a polling signal or another type of interrogation message transmitted by another device. As such, the wireless interface 114 may detect proximity of another device based on a polling signal or other type of interrogation message transmitted by the other device. The wireless interface 114 may detect proximity of another device based on additional or different techniques.

In the example communication system 100a shown in FIG. 1A, the first mobile device 102a can detect proximity of the second mobile device 102b based on wireless interactions between the wireless interfaces 114. For example, if the first mobile device 102a and the second device 102b are brought within a certain distance of each other, one or both of the wireless interfaces 114 may detect proximity of the other device. In some implementations, the mobile devices 102a, 102b can detect each other's proximity when the devices are brought within about 4 cm, 10 cm, or another distance of each other. In some instances, the conditions under which one of the mobile devices 102a, 102b detects proximity of the other may depend on settings or attributes of the particular mobile devices. For example, the wireless interfaces 114 may detect proximity based on receiving signals having a signal-to-noise ratio greater than a threshold level. Moreover, the conditions under which proximity can be detected may depend on the physical orientations of the mobile devices 102a, 102b, physical attributes of their environment, and other considerations.

The wireless interface 114 of the first mobile device 102a can wirelessly transmit the message 122 and the data 126 to the second device 102b. In some implementations, the first mobile device 102a wirelessly transmits the message 122 and the data 126 to the second mobile device 102b in response to detecting proximity of the second mobile device 102b. In some instances, the first mobile device 102a can transmit information to the second mobile device 102b based on additional or different criteria. Moreover, the first mobile device 102a may perform additional or different operations in response to detecting proximity of the second mobile device 102b.

In one aspect of operation, the first mobile device 102a detects proximity of the second mobile device 102b based on an interaction between the wireless interfaces 114 of the mobile devices 102a, 102b. In response to detecting proximity of the second mobile device 102b, the first mobile device 102a can access the shared secret 120 and the message 122. In some instances, the first mobile device 102a generates the message 122 in response to detecting proximity of the second mobile device 102b. The first mobile device 102a generates the data 126 based on the message 122 and the shared secret 120, and the first mobile device sends the data 126 and the message 122 to the second mobile device 102b by a wireless interaction between the wireless interfaces 114. In response to receiving the message 122 and the data 126, the second mobile device 102b can access the shared secret 120 and use the shared secret 120 to verify integrity of the message 122. In cases where the second mobile device 102b accepts the message 122, the second mobile device 102b can automatically take action based on the message 122. For example, because the integrity of the message 122 has been verified and accepted, the second mobile device 102b can trust the message 122 without requiring manual input, confirmation, or acknowledgement by a user.

FIG. 1B is a schematic diagram of an example communication system 100b. The example communication system 100b includes a mobile telecommunication device 102c and a tablet device 102d. In some aspects, the communication system 100b of FIG. 1B can represent an example implementation of the communication system 100a of FIG. 1A. In the example shown in FIG. 1B, the mobile telecommunication device 102c can be configured to operate as the mobile device 102a of FIG. 1A, and the tablet device 102d can be configured to operate as the mobile device 102b of FIG. 1B. The communication system 100b can include additional or different features not shown in FIG. 1B. For example, the communication system 100b can include a data network (e.g., an ad-hoc network, a WiFi network, a local area network, etc.) that allows the mobile telecommunication device 102c and the tablet device 102d to communicate with each other, and possibly with other devices or systems.

In the example shown in FIG. 1B, the mobile telecommunication device 102c and the tablet device 102d are both NFC-enabled devices. As such, both devices include an NFC module, and the devices can wirelessly communicate with each other by interactions between their NFC modules. In addition, a shared secret has been established on the mobile telecommunication device 102c and the tablet device 102d.

As shown in FIG. 1B, the mobile telecommunication device 102c displays a link 150 on a display of the mobile telecommunication device 102c. The link 150 can be a link to content accessible by the Internet, a link to content accessible on a local area network, a link to content stored locally on the tablet device 102d, or another type of link. The example link 150 shown in FIG. 1B is a link to a web page.

In some instances, if the mobile telecommunication device 102c is brought in proximity of the tablet device 102d while the link 150 is displayed on the mobile telecommunication device 102c, the mobile telecommunication device 102c automatically sends the link 150 to the tablet device 102d by NFC, and the link 150 is automatically opened, and the corresponding content is automatically displayed on the tablet device 102d. For example, the mobile telecommunication device 102c may detect proximity of the tablet device 102*d* based on an interaction between the NFC modules of the two devices. In response to detecting proximity of the tablet device 102*d*, the mobile telecommunication device 102*c* can generate a message 152 that identifies the link 150, generate integrity data 154 based on the message 152 and the shared secret, and then wirelessly transmit the message 152 and the integrity data 154 directly to the tablet device 102*d*.

The message 152 and the integrity data 154 can be transmitted from the mobile telecommunication device 102*c* to the tablet device 102*d* by a wireless interaction between the NFC modules of the two devices. In some implementations, the tablet device 102*d* receives the message 152 and the integrity data 154 and then verifies the integrity of the message 152 based on the integrity data 154 and the shared secret. For example, the tablet device 102*d* can locally generate integrity data and compare the locally-generated integrity data to the integrity data 154 received with the message 152. If the tablet device 102*d* accepts the message, the tablet device 102*d* can automatically access the content at the link 150 and display the content on the display of the tablet device 102*d*. As shown in FIG. 1B, the tablet device 102*d* opens the link 150 using a web browser application 160, and the corresponding content can be displayed in the web browser window 162.

Because the integrity of the message 152 is verified based on the shared secret, the tablet device 102*d* can trust the message 152, for example, without prompting for acknowledgment by a user. Similarly, in some implementations, the tablet device 102*d* can reject the message 152 without prompting for user interaction. For example, if the tablet device 102*d* determines that the integrity data 154 does not match the locally-generated integrity data, the tablet device 102*d* can reject the message 152. In some instances, the tablet device 102*d* may be configured to prompt for user acknowledgment after the message is accepted or rejected based on the integrity data 154.

FIG. 2 is a schematic diagram of an example mobile telecommunication device 200. For example, the mobile telecommunication device 200 can be a BLACKBERRY® telecommunication device and/or another type of mobile telecommunication device. In some implementations, the mobile telecommunication device 200 is a dual-mode device. The example mobile telecommunication device 200 in FIG. 2 includes a microprocessor 202, a communication subsystem 204, random access memory (RAM) 206, non-volatile memory 208, a display 210, one or more auxiliary input/output (I/O) devices 212, a data port 214, a keyboard 216, a speaker 218, a microphone 220, a Bluetooth subsystem 222, a Near Field Communication (NFC) subsystem 223, other device subsystems 224, a SIM/RUIM card (i.e., a Subscriber Identity Module or a Removable User Identity Module) 226, a SIM/RUIM interface 228, a rechargeable battery 230, a battery interface 232, and possibly other components. The mobile telecommunication device 200 can include the same, additional, or different features, which may be arranged or configured to operate in the manner shown or in a different manner.

The example mobile telecommunication device 200 is a battery-powered device that includes a battery interface 232 that receives direct current electrical power from one or more rechargeable batteries 230. The battery 230 can be a smart battery with an embedded microprocessor or a different type of battery. The battery interface 232 may be coupled to a regulator (not shown), which may assist the battery 230 in providing power V+ to the mobile telecommunication device 200. Additionally or alternatively, the mobile telecommunication device 200 may receive power from an external source (e.g., an alternating current power source, an adapter, a converter, etc.) and/or a different type of internal power source.

The example mobile telecommunication device 200 shown in FIG. 2 can operate as a two-way communication device having voice and data communication capabilities. The mobile telecommunication device 200 may communicate over wireless networks, including wireless telecommunication networks, wireless data networks, combined voice and data networks, and/or other types of wireless networks. Thus, the mobile telecommunication device 200 may communicate over a voice network, such as any of the analog or digital cellular networks, and may also communicate over a data network. Voice and data networks may be implemented as separate communication networks using separate infrastructure, such as base stations, network controllers, etc., or the voice and data networks may be integrated into a single wireless network. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or others.

In the example mobile telecommunication device 200 shown in FIG. 2, the communication subsystem 204 includes a receiver 250, a transmitter 252, antennae 254 and 256, one or more local oscillators 258, a digital signal processor (DSP) 260 and possibly other features. The antennae 254 and 256 may include antenna elements of a multiple-element antenna, embedded antennae, radio frequency (RF) antennae, and/or other types of antennae. The communication subsystem 204 can be used to communicate with a network. The DSP 260 can be used to receive and send signals through the receiver 250 and the transmitter 252, respectively, and the DSP 260 can provide control information to the receiver 250 and the transmitter 252. For example, the gain levels applied to communication signals in the receiver 250 and the transmitter 252 can be adaptively controlled through automatic gain control algorithms implemented in the DSP 260. Additional and/or different types of control algorithms may be implemented in the DSP 260 to provide more sophisticated control of the communication subsystem 204.

In some implementations, the local oscillator 258 includes a single local oscillator that provides a reference signal for the receiver 250 and the transmitter 252, for example, where voice and data communications occur at a single frequency, or closely-spaced sets of frequencies. In some cases, for example if different frequencies are utilized for voice communications and data communications, the local oscillator 258 may include multiple local oscillators that are used to generate multiple different frequencies corresponding to the voice and data networks. Information, which may include both digital voice and digital data information, can be communicated within the mobile telecommunication device 200 to and from the communication subsystem 204 through a link or bus between the DSP 260 and the microprocessor 202. The design and configuration of the communication subsystem 204, such as frequency band, component selection, power level, etc., may depend on the communication network in which the mobile telecommunication device 200 is intended to operate. For example the communication subsystem 204 may be configured for 2G, 2.5G, 3G, 4G, and other voice and data networks, such as GSM, CDMA2000, GPRS, EDGE, W-CDMA (UMTS), FOMA, EV-DO, TD-SCDMA, HSPA, HSOPA, and the like.

After any required network registration or activation procedures have been completed, the mobile telecommunication device 200 may send and receive communication signals, including both voice and data signals, over the wireless networks. Signals received by the antenna 254 from the communication network can be routed to the receiver 250, which can provide signal amplification, frequency down conversion, filtering, channel selection, etc., and may also provide analog to digital signal conversion. Analog to digital conversion of the received signal may allow the resulting digital signal to be decoded by the DSP 260. Signals to be transmitted to the network can be processed (e.g., modulated, encoded, etc.) by the DSP 260 and then provided to the transmitter 252 for digital to analog conversion, frequency up conversion, filtering, amplification and transmission to the communication network via the antenna 256.

In some implementations, the mobile telecommunication device 200 can send and receive communication signals over the wireless network after wireless network registration or activation procedures have been completed. The wireless network registration or activation procedures for the mobile telecommunication device 200 may vary based on the type of network or networks with which the mobile telecommunication device 200 operates. Wireless network access for the example mobile telecommunication device 200 shown in FIG. 2 can be associated with a subscriber or user of the mobile telecommunication device 200. In particular, the SIM/RUIM card 226 in the SIM/RUIM interface 228 may identify the subscriber or user of the mobile telecommunication device 200. The SIM/RUIM card 226 in the SIM/RUIM interface 228 may enable access to subscribed services through the wireless network. For example, subscribed services may include web browsing, e-mail, voice mail, Short Message Service (SMS), Multimedia Messaging Services (MMS), and/or others. The SIM/RUIM card 226 in the SIM/RUIM interface 228 can communicate with the microprocessor 202 on the mobile telecommunication device 200. To identify the subscriber, the SIM/RUIM card 226 may include user parameters, such as an International Mobile Subscriber Identity (IMSI) and/or another type of subscriber identifier. The SIM/RUIM card 226 may store additional and/or different subscriber information, including calendar information, call log information, contacts information, and/or other types of information. Additionally or alternatively, user identification information can also be stored in the non-volatile memory 208.

The data port 214 may include a serial port, a parallel port, and/or another type of connection port. In some implementations, the data port 214 is a Universal Serial Bus (USB) port that includes data lines for data transfer and a supply line that can provide a charging current to charge the battery 230 of the mobile telecommunication device 200. The mobile telecommunication device 200 may be manually synchronized with a host system, for example, by connecting the mobile telecommunication device 200 through the data port 214 (e.g., in an interface cradle and/or another type of wired connection) that couples the mobile telecommunication device 200 to a data port of a computer system or other device. The data port 214 may also be used to enable a user to set preferences through an external device or software application, or to download other programs for installation. The wired connection of the data port 214 may be used to load an encryption key onto the device.

The Bluetooth subsystem 222 and the NFC subsystem 223 each provide for communication between the mobile telecommunication device 200 and different systems or devices, without the use of the wireless network. For example, Bluetooth subsystem 222 and the NFC subsystem 223 can include radio frequency devices and associated circuits and components for short-range communication. The mobile telecommunication device 200 can include additional or different types of short-range communication subsystems. For example, the mobile telecommunication device 200 can include an infrared communication subsystem, a WiFi communication subsystem, or another type of short-range communication subsystem. In some implementations, one or more of the short-range communication subsystems can be configured according to one or more standards or other types of specifications. Examples of short-range communication standards include standards developed by the Infrared Data Association (IrDA), BLUETOOTH®, the 802.11 family of standards developed by IEEE, the NFC Forum, and others.

The Bluetooth subsystem 222 can include, for example, a controller module, a transceiver module, an antenna, or any suitable combination of these and other components. The Bluetooth subsystem 222 can be configured to send and receive messages according to any appropriate standard or specification for Bluetooth devices. In some implementations, the Bluetooth subsystem 222 can be configured to communicate by wireless signals having one or more frequencies in a range of 2400 MHz to 2480 MHz, or in another frequency range. The Bluetooth subsystem 222 can be configured to communicate with other Bluetooth-enabled devices.

The NFC subsystem 223 can include, for example, a controller module, a transceiver module, an antenna, or any suitable combination of these and other components. The NFC subsystem 223 can be configured to send and receive messages according to any appropriate standard or specification for NFC devices. In some implementations, the NFC subsystem 223 can be configured to communicate by wireless signals having one or more frequencies at or near 13.56 MHz, or in another frequency range. The NFC subsystem 223 can be configured to detect proximity of NFC tags and other NFC-enabled devices. The NFC subsystem 223 can be configured to communicate with the NFC tags and other NFC-enabled devices, for example, in response to detecting their proximity or in response to other events or criteria.

The example microprocessor 202 can manage and control the overall operation of the mobile telecommunication device 200. Many types of microprocessors or microcontrollers may be used, as appropriate. Additionally or alternatively, a single DSP 260 may be used to carry out one or more functions of the microprocessor 202. Low-level communication functions, including data and voice communications, may be performed through the DSP 260 in the communication subsystem 204. High-level communication applications, such as voice communication applications, data communication applications, and/or other types of software applications may be stored in the non-volatile memory 208 for execution by the microprocessor 202. The microprocessor 202 can interact with other device subsystems, such as the display 210, the RAM 206, the auxiliary input/output (I/O) devices 212, the data port 214, the keyboard 216, the speaker 218, the microphone 220, the SIM/RUIM interface 228, the battery interface 232, the Bluetooth subsystem 222, the NFC subsystem 223, and any other device subsystems generally designated as 224.

The non-volatile memory 208 includes erasable persistent storage, for example, flash memory, battery-backed-up RAM, and/or other types of memory. In the example shown in FIG. 2, the non-volatile memory 208 stores instructions and data associated with an operating system 234, programs 236 that provide various types of functionality for the mobile telecommunication device 200, and other types of information. The non-volatile memory 208 may include a file system to facilitate storage of data items on the device. For example, the operating system 234, the programs 236, and/or other modules executed on the microprocessor 202 may store, retrieve, modify, delete, and/or otherwise manipulate data by accessing (e.g., read, write, etc.) the file system provided on the non-volatile memory 208.

Data stored in the non-volatile memory 208 and/or other computer-readable media on the mobile telecommunication device 200 may include user application data, text files, image files, voicemail data, and other data generated by the user at the mobile telecommunication device 200 or received and stored by the mobile telecommunication device 200. The user application data may include, for example, e-mail message data, address book data, contact information data, calendar appointment data, instant message data, SMS message data, voicemail data, user-entered data, and/or other types of application data. Voicemail data may include digitized audio recordings and/or stub entries available for viewing in a messaging application indicating the availability of a voicemail message stored at another location. User-entered data may include text-based, graphic, or other multimedia files loaded onto the mobile telecommunication device 200 by the user.

The operating system 234 can control low-level functions of the mobile telecommunication device 200 and facilitate operation of the programs 236. For example, the operating system 234 may provide an interface between one or more of the programs 236 and one or more hardware components on the mobile telecommunication device 200. The programs 236 include computer program modules that can be executed by the microprocessor 202 (and/or the DSP 260 in some instances). In some implementations, one or more of the programs 236 are executed by the microprocessor 202 and provide a high-level interface between a user and the mobile telecommunication device 200. The user interface provided by a program 236 typically includes a graphical component provided through the display 210, and may additionally include an input/output component provided through the auxiliary I/O devices 212, the keyboard 216, the speaker 218, and/or the microphone 220. The operating system 234, specific device applications or programs 236, or parts thereof, may be temporarily loaded into a volatile store, such as RAM 206, for faster operation. Moreover, received communication signals may also be temporarily stored to RAM 206 before they are permanently written to a file system in the non-volatile memory 208.

The programs 236 stored in the non-volatile memory 208 may include, for example, a message application, a calendar application, one or more third party applications, and other types of applications. The programs 236 may include additional or different modules, programs, or applications, such as, for example, a Personal Information Manager (PIM) module, a connect module, a device state module, an IT policy module, a multi service platform manager, and/or others. The programs 236 may include programs that control basic device operations, which may be installed on the mobile telecommunication device 200 during its manufacture and/or initial configuration. Other types of software applications, such as, for example, third party applications and/or other types of modules, may be added after the manufacture and initial configuration of the mobile telecommunication device 200. Examples of third party applications include games, utilities, internet applications, etc. Generally, any of the programs 236 may be updated and/or modified at any time. The additional applications and/or updates to applications can be loaded onto the mobile telecommunication device 200 through the wireless network, the auxiliary I/O devices 212, the data port 214, the Bluetooth subsystem 222, the NFC subsystem 223, or any other suitable device subsystem 224. The non-volatile memory 208 may also store keys, which may include encryption and decryption keys and addressing information for use in communicating between the mobile telecommunication device 200 and servers.

Figure 3:
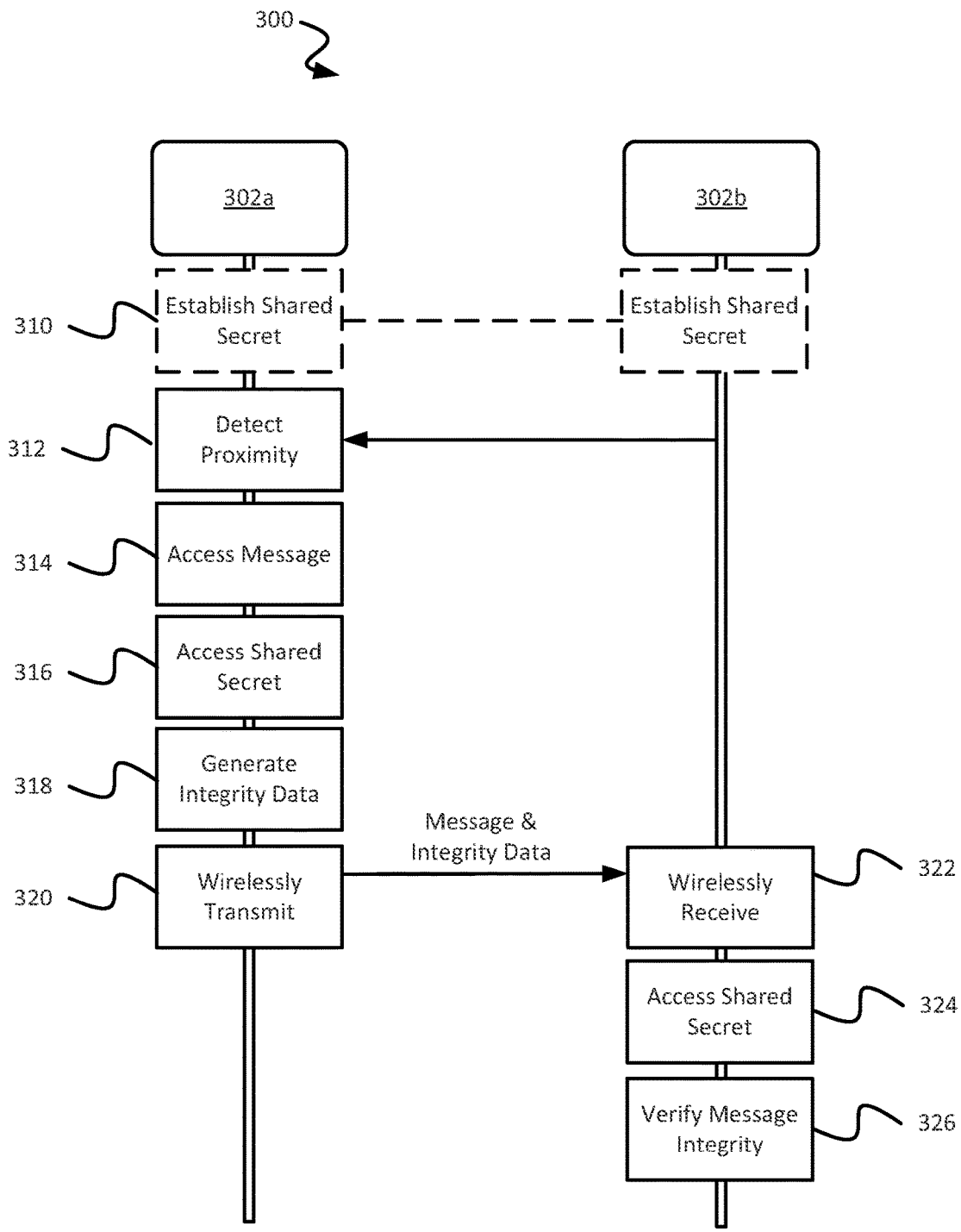
FIG. 3 is a signaling and flow diagram showing an example technique for communication among devices.

FIG. 3 is a signaling and flow diagram showing an example process 300 for communication among mobile devices. The process 300 can be implemented in a communication system. For example, the process 300 can be implemented by one or more components of the communication system 100a shown in FIG. 1A, the communication system 100b shown in FIG. 1B, or by a different type of system. The example process 300 shown in FIG. 3 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 3A can be executed as multiple separate operations, or one or more subsets of the operations shown in FIG. 3A can be combined and executed as a single operation.

A first device 302a and a second device 302b are shown in FIG. 3. The devices 302a, 302b may include mobile devices, computing systems, or any suitable combination of these and other types of devices. For example, the devices 302a, 302b can be the mobile devices 102a, 102b of FIG. 1A, the mobile devices 102c, 102d of FIG. 1B, or any other pair of suitable devices. In some implementations, the first device 302a or the second device 302 can be a mobile telecommunication device, a speakerphone device, a tablet device, a headset device, or any other suitable type of device. In the discussion that follows, operations shown in FIG. 3 are described as being performed by the first device 302a, the second device 302b, or both. In some implementations, one or more individual operations shown in FIG. 3 can be performed by one or more additional or different devices, or one or more of the operations that are shown as being performed by a combination of devices can be performed by a single device. As such, the example process 300 can be modified or reconfigured, as appropriate, for various types of implementations and in multiple different contexts.

At 310, a shared secret is established between the devices 302a, 302b. The shared secret can be a secret value (e.g., a private key) that is accessible to both devices 302a, 302b but not generally accessible by untrusted entities. The shared secret can be established in any suitable manner. In some implementations, the shared secret is established in a manner that is secure against eavesdropping or more sophisticated attacks by a third party adversary. Generally, a shared secret can be established between any two or more devices. For example, a particular user could have a shared secret established among the user's phone, laptop, tablet, and potentially other devices controlled by the user. As another example, two users could established a shared secret between their respective devices.

In some instances, the shared secret can be established by one or more of the example techniques shown in FIG. 4A, 4B, or 4C or by another technique. For example, in some implementations, the shared secret is established based on credentials exchanged between the first device 302a and the second device 302b over one or more wireless interfaces (e.g., NFC, Bluetooth, WiFi, etc.). As another example, in some implementations, the shared secret is established based on credentials provided through a user interface of the first device 302a, credentials provided through a user interface of the second device 302b, or both. As another example, in some implementations, the shared secret is established based on one or more certificates provided by a certificate authority.

At 312, the first device 302a detects proximity of the second device 302b. The first device 302a may detect proximity of the second device 302b based on physical proximity of the two devices and possibly other criteria. For example, the first device 302a may detect proximity of the second device 302b based on the second device 302b moving within a detection range (e.g., 4 cm, 10 cm, 20 cm, etc.) of the first device 302a. In some cases, the first device 302a detects proximity of the second device 302b based on a direct wireless interaction between the devices. In some implementations, the first device 302a detects proximity of the second device 302b by a proximity-activated wireless interface of the first mobile device. For example, the proximity-activated wireless interface can be an NFC interface, or another type of interface. In some implementations, the first device 302a detects proximity of the second device 302b based on information transmitted wirelessly from the second device 302b directly to the first device 302a.

In some implementations, at 312 the second device 302b wirelessly transmits information that permits the first device 302a to detect proximity of the second device 302b. For example, in some implementations, the second device 302b transmits a polling signal within range of the first device 302a, and the first device 302a detects proximity of the second device 302b by receiving the polling signal. As another example, in some implementations, the second device 302b receives a polling signal from the first device 302a, the second device 302b transmits a response to the polling signal within range of the first device 302a, and the first device 302a detects proximity of the second device 302b by receiving the response. The second device 302b may transmit additional or different types of information to permit the first device 302a to detect proximity of the second device 302b.

At 314, the first device 302a accesses a message. The message can include any type of information generated by the first device 302a, any type of information received by the first device 302a from another source, or a combination. In some cases, the message is accessed by the first device 302a in response to detecting proximity of the second device 302b. For example, the first device 302a may generate information, instructions, or other types of data to be sent to the second device 302b.

In some cases, the message can include a link to content, routing information for an e-mail or a call, or other types of information. As an example, if the first device 302a detects proximity of the second device 302b while a link is displayed or highlighted in a graphical display of the first device 302a, the first device 302a may generate a message that conveys the link to the second device 302b so that the link can be opened on the second device 302b. As another example, if the first device 302a detects proximity of the second device 302b while a phone number or information associated with a phone number (e.g., the name of a contact) is displayed or highlighted in a graphical display of the first device 302a, the first device 302a may generate a message that conveys the phone number to the second device 302b so that the second device 302b can initiate a call to the phone number. Additional or different types of routing information may be utilized, as appropriate.

At 316, the first device 302a accesses the shared secret. In some cases, the shared secret is accessed by the first device 302a in response to detecting proximity of the second device 302b. In some implementations, the shared secret stored at the first device 302a is associated with the second device 302b. For example, the shared secret may be stored at the first device 302a with information indicating that the shared secret was established with the second device 302b. As such, if the first device 302a identifies that a message is to be sent to the second device 302b, the first device 302a can retrieve a shared secret value associated with the second device 302b. In some cases, the first device 302a can then use the shared secret value associated with the second device 302b to generate integrity data for the message, which can enable the second device 302b to trust the message without acknowledgement from a user.

At 318, the first device 302a generates integrity data. In some instances, the integrity data are generated based on the message, the shared secret, and possibly additional information. The integrity data can include information that allows the second device 302b to verify integrity of the message. In some implementations, generating the integrity data includes generating an authentication value, a timestamp value, or a combination of these and other types of integrity data. For example, in some cases an authentication value is generated by evaluating a keyed hashing algorithm based on the message and the shared secret value. As such, the authentication value can be a Message Authentication Code (MAC) generated by evaluating a keyed Hash-based Message Authentication Code (HMAC) algorithm based on the message and the shared secret. In some cases, the first device 302a can generate a timestamp value associated with the authentication value. For example, the timestamp value can be used to prevent or reduce the likelihood of a replay attack. In some instances, the first device 302a appends the authentication value, the timestamp, or both to the message.

At 320, the first device 302a wirelessly transmits the message and the integrity data to the second device 302b. For example, the first device 302a can wirelessly transmit the authentication value, the timestamp value, or both values directly to the second device 302b. In some instances, the message and the integrity data are transmitted to the second device 302b in response to detecting proximity of the second device 302b. In some implementations, the message and the authentication value are wirelessly transmitted by the proximity-activated wireless interface of the first device 302a. In other words, the wireless interface that detected proximity of the second device 302b (at 312) can also be used to transmit the message and the integrity data to the second device 302b (at 320). In some implementations, the message and the integrity data are transmitted by an NFC module of the first device 302a and received by an NFC module of the second device 302b.

At 322, the second device 302b wirelessly receives the message and the integrity data from the first device 302a. In some instances, the message and authentication value are received at the second device 302b directly from the first device 302a in response to the second device 302b transmitting information that permits the first device 302a to detect proximity of the second device 302b. In some implementations, the message and the authentication value are wirelessly received by a proximity-activated wireless interface of the second device 302b (e.g., an NFC interface or another type of interface). In other words, the wireless interface that sent information to the first device 302a that allowed the first device 302a to detect proximity of the second device 302b (at 312) can also be used to receive the message and the integrity data from the first device 302a (at 322).

At 324, the second device 302b accesses the shared secret. In some cases, the shared secret is accessed by the second device 302b in response to detecting proximity of the first device 302a, in response to identifying that the message was transmitted by the first device 302a, or both. In some implementations, the shared secret is associated with the first device 302a. For example, the shared secret may be stored at the second device 302b with information indicating that the shared secret was established with the first device 302a. As such, if the second device 302b identifies that a message was received from the first device 302a, the second device 302b can retrieve a shared secret value associated with the first device 302a. In some cases, the second device 302b can then use the shared secret value associated with the first device 302a to verify integrity of the message. As such, if the integrity of the message is verified by the second device 302b based on the shared secret, the message can be trusted by the second device 302b without acknowledgement from a user.

At 326, the second device 302b verifies integrity of the message. For example, when the integrity data includes an authentication value, the integrity of the message can be verified based on the authentication value. In some instances, a test authentication value is generated locally at the second device 302b based on the message and the shared secret, and the integrity of the message is verified by comparing the test authentication value with the authentication value received from the first device 302a. The test authentication value can be generated by the second device 302b using the same technique used by the first device 302a to generate the authentication value. For example, when appropriate, the authentication value can be generated by evaluating a keyed hashing algorithm based on the message and the shared secret value. As such, the test authentication value can be a Message Authentication Code (MAC) generated by evaluating a keyed Hash-based Message Authentication Code (HMAC) algorithm based on the message and the shared secret.

In some cases, the integrity of the message can be verified by determining whether the first authentication value matches the second authentication value. For example, the message can be accepted by the second device 302b if the second device 302b determines that the test authentication value matches the authentication value received from the first device 302a; the message can be rejected by the second device 302b if the second device 302b determines that the test authentication value does not match the authentication value received from the first device 302a. In some cases, the integrity of the message can be further verified based on a timestamp associated with the authentication value received from the first device 302a.

The second device may perform one or more additional operations in response to verifying the integrity of the message. For example, when the message includes a link to content, the second device 302b can automatically display the content in response to verifying the integrity of the message. In some cases, the second device 302b accesses and displays the content independent of user confirmation or user acknowledgement at the second device 302b. As another example, when the message includes a phone number, the second device 302b can automatically call the phone number in response to verifying the integrity of the message.

In some cases, the second device 302b initiates a call independent of user confirmation or user acknowledgement at the second device 302b.

FIGS. 4A-4C are signaling and flow diagrams showing three example processes 400a, 400b, 400c for establishing a shared secret among mobile devices. The processes 400a, 400b, 400c can be implemented in a communication system. For example, the processes 400a, 400b, 400c can be implemented by one or more components of the communication system 100a shown in FIG. 1A, the communication system 100b shown in FIG. 1B, or by a different type of system. The example processes 400a, 400b, 400c can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 4A, 4B, or 4C can be executed as multiple separate operations, or one or more subsets of the operations can be combined and executed as a single operation.

Each of the example processes 400a, 400b, and 400c are illustrated as being performed by a first device 402a and a second device 402b. The devices 402a and 402b may include mobile devices, computing systems, or any suitable combination of these and other types of devices. For example, the devices 402a, 402b can be the mobile devices 102a, 102b of FIG. 1A, the mobile devices 102c, 102d of FIG. 1B, the devices 302a, 302b of FIG. 3, or any other pair of suitable devices. In the discussion that follows, operations shown in FIGS. 4A, 4B, and 4C are described as being performed by the first device 402a, the second device 402b, or both. In some implementations, one or more individual operations shown in FIGS. 4A, 4B, and 4C can be performed by one or more additional or different devices, and one or more of the operations that are shown as being performed by a combination of devices can be performed by a single device. As such, the example processes 400a, 400b, 400c can be modified or reconfigured, as appropriate, for various types of implementations and in multiple different contexts.

FIG. 4A shows the example process 400a for establishing a shared secret between the devices 402a and 402b. In the example process 400a shown in FIG. 4A, the devices 402a and 402b each include two or more wireless interfaces. In particular, both devices include an NFC interface and another wireless interface (e.g., Bluetooth, WiFi, etc.). In some implementations, the two wireless interfaces of each device are configured to transmit wireless signals in different frequency ranges. In some cases, the NFC interfaces 404a, 404b can be configured to transmit wireless signals at a frequency at or near 13.56 MHz, and the other interfaces 406a, 406b can be configured to transmit wireless signals at another frequency. For example, the other interfaces 406a, 406b may be configured to transmit wireless signals at frequencies in a range of 2400 MHz to 2480 MHz (e.g., for Bluetooth), at frequencies greater than 1 GHz (e.g., for WiFi), or at another frequency. The devices 402a, 402b may include additional or different features or components, as appropriate.

At 410, the NFC interface 404a of the first device 402a sends a handover request to the NFC interface 404b of the second device 402b. The handover request sent by NFC can include a request to communicate over an alternative carrier. The handover request can include an identification of available alternative carriers, such as, for example, Bluetooth, WiFi, or another type of carrier. At 412, the NFC interface 404b of the second device 402b sends a handover selection to the NFC interface 404a of the first device 402a. The handover selection can identify an alternative carrier selected by the second device 402b. For example, the handover selection can identify that the second device 402b has agreed to communicate by Bluetooth, by WiFi, or by another alternative carrier.

In some implementations, one or more aspects of the handover request (at 410) and the handover selection (at 412) can be executed based on conventional techniques. Some example conventional techniques for generating a handover request and a handover selection are described in the Connection Handover Technical Specification published by the NFC Forum (see, e.g., Connection Handover 1.2, dated Jul. 7, 2010). The handover request (at 410) and the handover selection (at 412) can be executed based on additional or different techniques.

At 414a and 414b, the first device 402a and the second device 402b exchange credentials. In particular, at 414a, the NFC interface 404a of the first device 402a and the NFC interface 404b of the second device 402b exchange a first set of credentials; and at 414b, the other interface 406a of the first device 402a and the other interface 406b of the second device 402b exchange a second set of credentials. As such, in the example shown in FIG. 4A, credentials are split into multiple parts, and a security association is established over multiple wireless interfaces. In some instances, transmitting different parts of the access credentials by different wireless interfaces can reduce the likelihood of an eavesdropper acquiring the full credentials, for example, at a single point of attack. The credentials exchanged at 414a and 414b can be used by the devices 402a, 402b to derive a shared secret.

Some wireless connections, such as Bluetooth, WiFi, and others, utilize a pairing protocol with some level of security to protect against eavesdropping. When two devices execute the paring protocol, a shared secret can be established between the devices. Accordingly, a shared secret can be established between the devices 402a, 402b based at least partially on a Bluetooth, WiFi, or another type pairing protocol. In some implementations, a different shared secret can be established each time the devices are paired.

As shown in FIG. 4A, the pairing between the devices can be leveraged for future NFC communication. For example, in some implementations, the devices 402a, 402b can use the shared secret established based on the pairing protocol to verify integrity of messages exchanged between the devices 402a, 402b over NFC. Accordingly, in the example shown in FIG. 4A, a shared secret is established between the devices 402a, 402b based on interactions between the other interfaces 406a, 406b (e.g., Bluetooth or WiFi), and the shared secret is used to exchange trusted messages between the NFC interfaces 404a, 404b.

At 416, the NFC interface 404a of the first device 402a and the NFC interface 404b of the second device 402b exchange messages and integrity data. Having established the shared secret, the devices 402a, 402b can generate integrity data for messages to be exchanged over NFC. The integrity data can include, for example, an authentication value based on the shared secret. The integrity data can additionally include a timestamp value, for example, indicating when the authentication value was generated, or another relevant time. In some implementations, the devices 402a, 402b shown in FIG. 4A can communicate based on one or more operations of the example process 300 shown in FIG. 3. The devices 402a, 402b may communicate based on additional or different techniques.

In some examples, when the first device 402a has a message to send to the second device, the first device 402a generates an authentication value based on the message and the shared secret, the first device 402a generates a timestamp value associated with the authentication value, and the first device 402a sends the message along with the authentication value and the timestamp value to the second device 402b. In some instances, the authentication value, the timestamp value, or both can be appended to the message. In some instances, the authentication value and the timestamp value can be associated with the message in a different manner.

The second device 402b can verify the integrity of the message, and thereby determine whether to trust the message based on the authentication value and the timestamp value. For example, the second device 402b can check that the timestamp is within a certain tolerance, for example, to prevent replay attacks. The second device 402b can check that the authentication value was generated based on the message and the shared secret. The second device 402b may verify the integrity of the message using additional or different techniques, as appropriate.

The devices 402a, 402b can exchange multiple NFC messages based on a single shared secret. In some instances, the devices 402a, 402b can refresh the shared secret after a specified amount of time or based on other criteria. For example, the shared secret can be considered valid for a certain period of time or a certain number of messages, and then a new shared secret can be established between the devices 402a, 402b by any suitable technique.

FIG. 4B shows the example process 400b for establishing a shared secret between the devices 402a and 402b. In the example process 400b shown in FIG. 4B, the devices 402a and 402b each include an NFC interface and a user interface, and the user interface of each device is operable to receive input from a user 409. The example user interfaces 408a, 408b can include any suitable user interface components or modules. For example, a user interface can include a touchscreen, a keyboard, a trackball, a pointing device, or any suitable combination of these and other types of user interface devices. The devices 402a, 402b may include additional or different features or components, as appropriate.

At 420a and 420b, the devices 402a, 402b receive credentials. At 420a, the user interface 408a of the first device 402a receives credentials from the user 409; and at 420b, the user interface 408b of the second device 402b receives credentials from the user 409. In some examples, the credentials are received at the respective devices from the same user or from two different users. The credentials provided by the user 409 can include, for example, alphanumeric symbols entered through a keyboard or a graphical interface, gestures or movements detected by a pointing device, or a combination of these and other types of information. Each of the devices 402a, 402b can use the credentials provided by the user 409 as a shared secret, or each of the devices 402a, 402b can derive or otherwise generate a shared secret based on the credentials provided by the user 409.

At 422, the NFC interface 404a of the first device 402a and the NFC interface 404b of the second device 402b can exchange messages and integrity data. In some implementations, the devices 402a, 402b can exchange messages and integrity data as described with respect to operation 416 shown in FIG. 4A. For example, having established a shared secret based on the credentials entered by the user 409, the devices 402a, 402b can generate integrity data for messages to be exchanged over NFC. The integrity data can include, for example, an authentication value based on the shared secret. The integrity data can additionally include a timestamp value, for example, indicating when the authentication value was generated, or another relevant time. In some implementations, the devices 402a, 402b shown in FIG. 4B can communicate based on one or more operations of the example process 300 shown in FIG. 3. The devices 402a, 402b may communicate based on additional or different techniques.

FIG. 4C shows the example process 400c for establishing a shared secret between the devices 402a and 402b. In the example process 400c shown in FIG. 4C, the devices 402a and 402b each include an NFC interface. Moreover, the devices 402a, 402b are both configured to receive certificate data from a certificate authority 430. In some implementations, the certificate authority 430 can be a certificate authority module implemented by one of the devices 402a, 402b. In some implementations, the certificate authority 430 can be a certificate authority module implemented by another device (e.g., a remote or local device). One or both of the devices 402a, 402b may be configured to communicate with the certificate authority over a communication link. The communication link may include one or more wired or wireless links, one or more data networks, or a combination of these and other types of data connections. The devices 402a, 402b may include additional or different features or components, as appropriate.

At 432a and 432b, the first device 402a and the second device 402b each obtain certificate data from the certificate authority 430. The certificate data can include one or more digital certificates issued by the certificate authority 430. One or both of the devices 402a, 402b may receive the certificate data by a wired or wireless connection to another device, over a network, or otherwise. In some implementations, one of the devices 402a, 402b can act as the certificate authority 430. Accordingly, a certificate may be obtained by accessing the certificate from a local memory, generating the certificate locally on the device, or in another manner. In some implementations, the devices 402a, 402b obtain all or part of the certificate data from each other, for example, by exchanging digital certificates.

The certificate data obtained by the devices 402a, 402b can include one or more digital certificates. Generally, a digital certificate certifies a particular public key associated with a device or user entity, and may also certify that the device or user entity has possession of a private key corresponding to the certified public key. In some examples, the first device 402a obtains a certificate containing the public key of the second device 402b, and the second device 402b obtains a certificate containing the public key of the first device 402a. The digital certificates can include implicit certificates, explicit certificates, or other types of digital certificates. Examples of conventional digital certificates include X.509 certificates, Elliptic Curve Qu Vanstone (ECQV) implicit certificates, and others.

One or more devices owned or managed by the same entity may be configured to perform the duties of a certificate authority for a subset of other devices under control of the same entity. In some implementations, a mobile device can act as a root certificate authority, a subordinate certificate authority, or another type of certificate authority. For example, a secondary certificate authority can be chained to a root certificate authority, and the secondary certificate authority can issue certificates to other devices. For example, if the owner of the a mobile device has its own certificate authority, then the mobile device can be configured to issue certificates to other devices that it trusts.

At 434, the first device 402a and the second device 402b execute a key agreement protocol. For example, the key agreement protocol can use the certificate data to establish a shared secret for NFC communications. In some cases, the key agreement protocol can include operations performed locally by the devices 402a, 402b and operations that require correspondence between the devices 402a, 402b. The correspondence can be executed over any suitable type of data link or connection between the devices. As a result of executing the key agreement protocol, a shared secret value can be stored at the first device 402a and the second device 402b. The key agreement protocol can be executed in a manner that prevents or reduces the likelihood of an eavesdropper obtaining the shared secret.

The key agreement protocol can include operations based on the certificate data obtained by the first device 402a and the second device 402b. For example, the key agreement protocol may utilize the public and private keys associated with one or more digital certificates. The key agreement protocol may include operations performed by a pseudorandom generator, a cryptographic processing unit, or other types of modules on the devices 402a, 402b. Any suitable key agreement protocol can be used. In some implementations, a standardized key agreement protocol is used. Example key agreement protocols include the Diffie-Hellman key agreement protocol, the Elliptic Curve Menezes Qu Vanstone (EC MQV) key agreement protocol, the HMQV key agreement protocol, and others.

At 436, the NFC interface 404a of the first device 402a and the NFC interface 404b of the second device 402b can exchange messages and integrity data. In some implementations, the devices 402a, 402b can exchange messages and integrity data as described with respect to operation 416 shown in FIG. 4A. For example, having established a shared secret based on the certificates provided by the certificate authority 430, the devices 402a, 402b can generate integrity data for messages to be exchanged over NFC. The integrity data can include, for example, an authentication value based on the shared secret. The integrity data can additionally include a timestamp value, for example, indicating when the authentication value was generated, or another relevant time. In some implementations, the devices 402a, 402b shown in FIG. 4C can communicate based on one or more operations of the example process 300 shown in FIG. 3. The devices 402a, 402b may communicate based on additional or different techniques.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. A computing device typically includes a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, data integrity is provided for wireless communication between mobile devices. For example, the mobile devices may communicate by a Near Field Communication (NFC) interface or another type of proximity-activated wireless interface.

In some aspects, information is wirelessly transmitted from a first mobile device to a second mobile device. Transmitting the information permits the second mobile device to detect proximity of the first mobile device. A message and a first authentication value are wirelessly transmitted from the second mobile device directly to the first mobile device in response to the information, and the message and the first authentication value are received at the first mobile device. A shared secret value associated with the second mobile device is accessed at the first mobile device. A second authentication value is generated at the first mobile device based on the message and the shared secret value. The integrity of the message is verified based on comparing the first authentication value and the second authentication value.

Implementations of these and other aspects can include one or more of the following features. The information is wirelessly transmitted from the first mobile device to the second mobile device by a proximity-activated wireless interface of the first mobile device. The message and the first authentication value are received at the first mobile device by the proximity-activated wireless interface. The proximity-activated wireless interface includes a Near Field Communication (NFC) interface. Wirelessly transmitting information from the first mobile device to the second mobile device includes wirelessly transmitting the information from a tablet device to a mobile telecommunication device by a proximity-activated wireless interface.

Additionally or alternatively, implementations of these and other aspects can include one or more of the following features. The shared secret value is established between the first mobile device and the second mobile device. The first mobile device includes a first wireless communication module and a second wireless communication module. The message and the first authentication value are received at the first mobile device by the first wireless communication module. The shared secret value is established based in part on transmitting data from the first mobile device by the second wireless communication module. The first wireless communication module transmits wireless signals at a frequency of 13.56 MHz, and the second wireless communication module transmits wireless signals at a second frequency in the range of 2400 MHz to 2480 MHz. The first wireless communication module transmits wireless signals at a frequency of 13.56 MHz, and the second wireless communication module transmits wireless signals at a second frequency greater than 1 GHz.

Additionally or alternatively, implementations of these and other aspects can include one or more of the following features. The shared secret value is established between the first mobile device and the second mobile device. The first mobile device includes a user interface. Establishing the shared secret value includes receiving the shared secret value at the first mobile device based on a user interaction with the user interface. Establishing the shared secret value includes accessing, at the first mobile device, a certificate issued by a certificate authority. Establishing the shared secret value includes deriving the shared secret at the first mobile device based on the certificate.

Additionally or alternatively, implementations of these and other aspects can include one or more of the following features. Verifying the integrity includes determining whether the first authentication value matches the second authentication value. The message is accepted at the first mobile device based on determining that the first authentication value matches the second authentication value. The message is rejected at the first mobile device based on determining that the first authentication value does not match the second authentication value. The second authentication value is generated by evaluating a keyed hashing algorithm based on the message and the shared secret value. Generating the second authentication value includes generating a Message Authentication Code (MAC) by evaluating a keyed Hash-based Message Authentication Code (HMAC) algorithm based on the message and the shared secret value. A timestamp value associated with the first authentication value is received at the first mobile device. Integrity of the message is verified based on the timestamp value.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for trusted communication among mobile devices, the method comprising:
    establishing a shared secret value between a first mobile device and a second mobile device, wherein the first mobile device includes a first wireless communication module and a second wireless communication module, the second wireless communication module is different than the first communication module, and wherein the shared secret value is established based in part on a first set of credentials transmitted from the first mobile device to the second mobile device by the first wireless communication module and a second set of credentials transmitted by the second communication module, the first set of credentials different than the second set of credentials;
    wirelessly transmitting information, from the first mobile device to the second mobile device, permitting the second mobile device to detect proximity of the first mobile device;
    receiving, at the first mobile device, a message, a first authentication value, and a timestamp value wirelessly transmitted from the second mobile device directly to the first mobile device in response to the information, wherein the first authentication value is generated based on the message and the shared secret value stored at both the first mobile device and the second mobile device, the message includes user data, the first authentication value is appended to the message, and the message and the first authentication value are received at the first mobile device by the second wireless communication module;
    accessing the shared secret value stored at the first mobile device and associated with the second mobile device;
    generating a second authentication value at the first mobile device based on the message and the shared secret value; and
    verifying integrity of the message based on the timestamp value and comparing the first authentication value and the second authentication value.

2. The method of claim 1, wherein the information is wirelessly transmitted from the first mobile device to the second mobile device by a proximity-activated wireless interface of the first mobile device, and the message and the first authentication value are received at the first mobile device by the proximity-activated wireless interface.

3. The method of claim 2, wherein the proximity-activated wireless interface comprises a Near Field Communication (NFC) interface.

4. The method of claim 1, wherein wirelessly transmitting information from the first mobile device to the second mobile device comprises wirelessly transmitting the information from a tablet device to a mobile telecommunication device by a proximity-activated wireless interface.

5. The method of claim 1, wherein the message comprises a link to content, and the method further comprises automatically displaying the content at the first mobile device in response to verifying the integrity.

6. The method of claim 5, wherein automatically displaying comprises displaying the content at the first mobile device independent of user confirmation at the first mobile device.

7. The method of claim 1, wherein the message comprises a phone number, and the method further comprises automatically initiating a call to the phone number at the first mobile device in response to verifying the integrity.

8. The method of claim 1, wherein verifying the integrity comprises determining whether the first authentication value matches the second authentication value.

9. The method of claim 8, further comprising accepting the message at the first mobile device based on determining that the first authentication value matches the second authentication value.

10. The method of claim 8, further comprising rejecting the message at the first mobile device based on determining that the first authentication value does not match the second authentication value.

11. The method of claim 1, wherein the first mobile device includes a user interface, and establishing the shared secret value between the first mobile device and the second mobile device includes receiving the shared secret value at the first mobile device based on a user interaction with the user interface.

12. The method of claim 1, wherein the second wireless communication module transmits wireless signals at a frequency of 13.56 MHz, and the first wireless communication module transmits wireless signals at a second frequency in a range of 2400 MHz to 2480 MHz.

13. The method of claim 1, wherein the second wireless communication module transmits wireless signals at a frequency of 13.56 MHz, and the first wireless communication module transmits wireless signals at a second frequency greater than 1 GHz.

14. The method of claim 1, wherein establishing the shared secret value between the first mobile device and the second mobile device includes:
    accessing, at the first mobile device, a certificate issued by a certificate authority; and
    deriving the shared secret value at the first mobile device based on the certificate.

15. The method of claim 1, wherein the second authentication value is generated by evaluating a keyed hashing algorithm based on the message and the shared secret value.

16. The method of claim 1, wherein generating the second authentication value comprises generating a Message Authentication Code (MAC) by evaluating a keyed Hash-based Message Authentication Code (HMAC) algorithm based on the message and the shared secret value.

17. A mobile device comprising:
memory operable to store a shared secret value;
a wireless communication interface;
a first wireless communication module;
a second wireless communication module that is different than the first communication module;
data processing apparatus operable to perform operations comprising:
establishing a shared secret value between the mobile device and a second mobile device, wherein the shared secret value is established based in part on a first set of credentials transmitted from the first mobile device to the second mobile device by the first wireless communication module and a second set of credentials transmitted by the second communication module, the first set of credentials different than the second set of credentials;
sending to the second mobile device information permitting the second mobile device to detect proximity of the wireless communication interface;
receiving a message, a first authentication value, and a timestamp value wirelessly transmitted from the second mobile device directly to the wireless communication interface in response to the information, wherein the first authentication value is generated based on the message and the shared secret value stored at both the mobile device and the second mobile device, the message includes user data, the first authentication value is appended to the message, and the message and the first authentication value are received at the mobile device by the second wireless communication module;
generating a second authentication value based on the message and the shared secret value; and
verifying integrity of the message based on the timestamp value and comparing the first authentication value and the second authentication value.

18. The mobile device of claim 17, wherein the wireless communication interface includes a Near Field Communication (NFC) interface.

19. The mobile device of claim 18, wherein the message and the first authentication value are received by the NFC interface.

20. The mobile device of claim 17, wherein the first wireless communication module is operable to communicate with the second mobile device by wireless signals in a first frequency range, and the second wireless communication module is operable to communicate with the second mobile device by wireless signals in a second frequency range.

21. The mobile device of claim 17, further comprising a mobile device display, wherein the message comprises a link to content, and the mobile device is configured to automatically display the content on the mobile device display in response to verifying the integrity.

22. The mobile device of claim 21, wherein automatically displaying comprises displaying the content on the mobile device display independent of user confirmation at the mobile device.

23. The mobile device of claim 17, wherein the second authentication value is generated by evaluating a keyed hashing algorithm based on the message and the shared secret value.

24. The mobile device of claim 17, wherein generating the second authentication value comprises generating a Message Authentication Code (MAC) by evaluating a keyed Hash-based Message Authentication Code (HMAC) algorithm based on the message and the shared secret value.

25. The mobile device of claim 17, wherein the mobile device comprises a mobile telecommunication handset.

26. The mobile device of claim 17, wherein the mobile device comprises a tablet device.

27. A non-transitory computer-readable medium storing instructions that are operable when executed by data processing apparatus to perform operations for trusted communication among mobile devices, the operations comprising:
establishing a shared secret value between a first mobile device and a second mobile device, wherein the first mobile device includes a first wireless communication module and a second wireless communication module, the second wireless communication module is different than the first communication module and wherein the shared secret value is established based in part on a first set of credentials transmitted from the first mobile device to the second mobile device by the first wireless communication module and a second set of credentials transmitted by the second communication module, the first set of credentials different than the second set of credentials;
wirelessly transmitting information from the first mobile device to the second mobile device permitting the second mobile device to detect proximity of the first mobile device;
receiving, at the first mobile device, a message, a first authentication value, and a timestamp value wirelessly transmitted from the second mobile device directly to the first mobile device in response to the information, wherein the first authentication value is generated based on the message and the shared secret value stored at both the first mobile device and the second mobile device, the message includes user data, the first authentication value is appended to the message, and the message and the first authentication value are received at the first mobile device by the second wireless communication module;
accessing the shared secret value stored at the first mobile device and associated with the second mobile device;
generating a second authentication value at the first mobile device based on the message and the shared secret value; and
verifying integrity of the message based on the timestamp value and comparing the first authentication value and the second authentication value.

28. The computer-readable medium of claim 27, wherein the information is wirelessly transmitted from the first mobile device by a proximity-activated wireless interface of the first mobile device, and wherein the message and the first authentication value are received by the proximity-activated wireless interface of the first mobile device.

29. The computer-readable medium of claim 28, wherein the proximity-activated wireless interface comprises a Near Field Communication (NFC) interface.

30. The computer-readable medium of claim 27, wherein the message comprises a link to content, and the operations further comprise automatically displaying the content at the first mobile device in response to verifying the integrity.

31. The computer-readable medium of claim 30, wherein automatically displaying comprises displaying the content at the first mobile device independent of user confirmation at the first mobile device.

32. The computer-readable medium of claim 27, wherein the first mobile device includes a user interface, and establishing the shared secret value between the first mobile device and the second mobile device includes receiving the shared secret value at the first mobile device based on a user interaction with the user interface.

33. The computer-readable medium of claim 27, wherein establishing the shared secret value between the first mobile device and the second mobile device includes:
   accessing, at the first mobile device, a certificate issued by a certificate authority; and
   deriving the shared secret at the first mobile device based on the certificate.

34. The computer-readable medium of claim 27, wherein the second authentication value is generated by evaluating a keyed hashing algorithm based on the message and the shared secret value.

* * * * *